(12) United States Patent
Michaux et al.

(10) Patent No.: US 9,458,372 B2
(45) Date of Patent: Oct. 4, 2016

(54) FLUID LOSS CONTROL AGENTS AND COMPOSITIONS FOR CEMENTING OIL AND GAS WELLS COMPRISING SAID FLUID LOSS CONTROL AGENT

(71) Applicant: Schlumberger Technology Corporation, Sugar Land, TX (US)

(72) Inventors: Michel Michaux, Verrieres-le-Buisson (FR); Bruno Drochon, Houston, TX (US); Sylwia Komocki, Chatenay Malabry (FR)

(73) Assignee: SCHLUMBERGER TECHNOLOGY CORPORATION, Sugar Land, TX (US)

( * ) Notice: Subject to any disclaimer, the term of this patent is extended or adjusted under 35 U.S.C. 154(b) by 0 days.

(21) Appl. No.: 14/597,136

(22) Filed: Jan. 14, 2015

(65) Prior Publication Data
US 2015/0122496 A1  May 7, 2015

Related U.S. Application Data

(62) Division of application No. 11/721,835, filed as application No. PCT/EP2005/013007 on Dec. 1, 2005, now Pat. No. 8,962,710.

(30) Foreign Application Priority Data

Dec. 21, 2004 (EP) .................................... 04293073

(51) Int. Cl.
*E21B 33/13* (2006.01)
*C09K 8/487* (2006.01)
*C04B 28/02* (2006.01)
*C04B 40/00* (2006.01)
*C04B 24/26* (2006.01)
*E21B 33/14* (2006.01)

(52) U.S. Cl.
CPC ............ *C09K 8/487* (2013.01); *C04B 24/2652* (2013.01); *C04B 24/2676* (2013.01); *C04B 28/02* (2013.01); *C04B 40/0039* (2013.01); *E21B 33/14* (2013.01)

(58) Field of Classification Search
CPC ...................................................... C09K 8/487
USPC ......................................................... 523/130
See application file for complete search history.

(56) References Cited

U.S. PATENT DOCUMENTS 4,537,918 A * 8/1985 Parcevaux ........... C04B 24/2676
166/293
5,099,922 A   3/1992 Ganguli et al.
(Continued)

OTHER PUBLICATIONS

Office Action issued in related EP application 04293073.5 on May 3, 2016, 6 pages.

*Primary Examiner* — David Karst
(74) *Attorney, Agent, or Firm* — Jeremy D. Tillman; Tim Curington; Michael Flynn

(57) ABSTRACT

A method of cementing a well is disclosed. The method comprising pumping into the well a cement slurry comprising a solid blend including cement, water, and a fluid loss control agent, and allowing the cement slurry to set. The fluid loss control agent comprises a styrene-butadiene latex and a high molecular-weight water-soluble polymer such as a copolymer AMPS-Am. The addition of the water-soluble polymer allows drastic reduction of the quantity of latex required to achieve fluid loss control performance and even gas migration control.

17 Claims, 1 Drawing Sheet

(56) References Cited

U.S. PATENT DOCUMENTS

| | | | |
|---|---|---|---|
| 5,258,072 A * | 11/1993 | Gopalkirshnan | C04B 24/122 106/724 |
| 6,277,900 B1 * | 8/2001 | Oswald | C04B 24/163 523/130 |
| 2002/0049280 A1 | 4/2002 | Westerman | |
| 2010/0004351 A1 | 1/2010 | Michaux et al. | |

* cited by examiner

FLUID LOSS CONTROL AGENTS AND COMPOSITIONS FOR CEMENTING OIL AND GAS WELLS COMPRISING SAID FLUID LOSS CONTROL AGENT

CROSS-REFERENCE TO RELATED APPLICATIONS

The current application is a divisional application of U.S. application Ser. No. 11/721,835 (US2010/0004351), filed on Dec. 16, 2009 as a PCT national phase application of PCT/EP2005/013007 (WO2006/066725), which in turn claims the priority of EP Application No. 04293073.5 (EP1674434), filed on Dec. 21, 2004. The entire contents of these related applications are incorporated by reference into the current application.

TECHNICAL FIELD OF THE INVENTION

The present invention concerns the field of petroleum service and supply industries, in particular that of cementing the annulus surrounding the casing in an oil, gas, water, geothermal or analogous well. More precisely, the invention relates to cement slurry formulations which can prevent the passage of gas during the whole cement setting phase.

BACKGROUND OF THE INVENTION

A key objective in well cementing is to isolate the different formation layers traversed by the well to prevent migration between the different geological layers or between the layers and the surface. In particular, it is essential from the point of view of safety to prevent any gas from rising through the annulus between the well wall and the casing.

When the cement has set, it is impermeable to gas. Because of the hydraulic pressure of the height of the cement column, the injected slurry is also perfectly capable of preventing such migration. However, between the two states, there is a critical phase that lasts up to several hours during which the cement slurry no longer behaves as a liquid but also does not yet behave as an impermeable solid. For this reason, the industry has developed a series of additives aiming at maintaining a gas tight seal during the whole cement-setting period.

Among such (numerous) additives are those which also tend to reduce fluid loss, i.e., prevent dehydration of the petroleum industry fluid when the latter comes into contact with a natural porous or fissured formation. This loss of water can impair the proper placement of slurry in the annulus due to drastic increase in its rheological parameters; plastic viscosity and yield stress. In general, cement slurries with a fluid loss of less than 50 ml over thirty minutes, measured in accordance with API (American Petroleum Institute) standards, are also impermeable to gas, although the correlation between the two phenomena is not systematic, and other parameters such as the almost complete absence formation of free fluid (although known as free water) is also necessary, especially in a non vertical slanted well since the supernatant free fluid can create a path for the migration of gas.

The fluid loss is controlled by adding to the cement slurry either high molecular-weight water-soluble polymers or particulate additives such as latices or crosslinked polymers.

The efficiency of water-soluble polymers is generally limited because they cannot be used at high concentrations owing to too high slurry viscosities at the mixing stage. This may be a major limitation when the solid volume fraction of slurry is high (e.g. higher than 50%) and/or when the slurry is designed for elevated temperatures since fluid loss control provided by these polymers is primarily based on a thickening effect of the interstitial water of slurry.

Some latices provide excellent fluid-loss control (API value below 50 mL/30 min.) and, therefore, are frequently used for gas migration control. However rather high concentrations are required, making latices not cost effective when there is no risk for gas migration. It is believed that small latex particles (around 150 nm diameter) fill the pores of cement filter cake, and can coalesce to form an impermeable layer of polymer. It may be difficult to increase the plastic viscosity of latex cement slurries that generally are thin. In some cases it can be difficult to properly remove the drilling mud when the slurry viscosity is low.

Though the use of latices, such as natural rubber latex, in Portland cements was common since the 1920s, especially because of the improvements in mechanical performance, a key improvement occurred in 1985, when Parcevaux et al. identified styrene-butadiene latex an effective additive for preventing annular gas migration. This system is known for instance from European Patent 0 091 377 (or its counterpart U.S. Pat. No. 4,537,918) that more specifically discloses cement slurry compositions inhibiting pressure gas channeling in the cemented annulus, even at high temperature, consisting essentially of a hydraulic cement, about 5-30% by weight of cement of a compatible styrene (70-30 weight percent)/butadiene (30-70 weight percent) copolymer latex and about 1-20% by weight of latex of a latex stabilizer and water in an amount such that the total fluid content of water, latex and stabilizer is about 30-70% by weight of cement.

In an attempt to control gas channeling at lower cost, U.S. Pat. No. 5,099,922 (Ganguli) describes the use of a copolymer of 5 to 95 weight percent 2-acrylamido-2-methylpropane-3-sulphonic acid (AMPS); (2) 5 to 95 weight percent of vinylacrylamide; and (3) 0 to 80 weight percent of acrylamide. This copolymer may be used in combination with a gas channeling inhibiting amount of an experimental styrene/butadiene latex, wherein the styrene is substituted with at least one selected from the group consisting of —COOR, —SO$_3$R, and —OH, wherein R is H or a C$_1$-C$_5$ alkyl groups. However, there is no report of a synergetic effect of this combination and all tests were carried out at bottomhole temperature of 180° F. (82° C.).

Further, a cement slurry comprises in practice a whole series of additives, almost systematically among them an agent which encourages dispersion of the cement particles. The dispersing agents used vary depending on the type of wellbores or, more exactly, depending on the temperature to which the cement is subjected. Argillaceous minerals such as bentonite are also frequently used as they can reduce the density of the cement slurry, an essential point when cementing in zones where the formation pressure is low. The question of the compatibility of each new additive with current additives, over a wide range of working temperatures and pressures, is thus fundamental, it being understood that no additive is genuinely universal.

Therefore it would be suitable to provide new fluid loss control agents that could overcome some of the drawbacks of the prior art, in particular in terms of costs.

SUMMARY OF THE INVENTION

The authors of the present invention have found that the addition of a small amount of water-soluble polymer to (non-substituted) styrene-butadiene latices allows drastic reduction of the amount of latex required to achieve excellent fluid loss control.

Without wishing to be limited by any theory, this synergetic combination may be primarily attributed to both an increase in the viscosity of the interstitial water due to the part of polymer that is not adsorbed onto cement grains and a decrease in the pore size of cement filter cake due to the part of polymer that is adsorbed onto cement grains thanks to its sulfonate and carboxylate groups (when part of acrylamide is hydrolyzed into acrylate).

It is believed that the synergetic effect is achieved only with water-soluble polymers of relatively high molecular weight, such at higher than about 200,000 and preferably higher than 500,000. It is also believed that polymers having a molecular weight higher than about 4,000,000 are not suitable. Best results have been achieved with water-soluble polymers having a molecular weight of about 800,000 (typically between 600,000 and 1,200,000).

In yet a preferred embodiment, the water-soluble polymer is an anionic synthetic co- or ter-polymer derived from acrylamide (Am), most preferably containing a sulfonate monomer: 2-acrylamido 2-methylpropanesulfonic acid (AMPS).

The concentration of each component in the mixture is significantly lower than that of individual components when they are used separately. The mixture of latex and water-soluble polymer is effective as fluid-loss control additive over a wide temperature range. Contrary to what is observed with individual components, in terms of fluid-loss control, the performance is only slightly dependent upon the temperature (tested from 38° C. to 177° C.). Consequently elevated temperatures do not require much higher concentrations. Cement slurries containing this mixture have an appropriate rheology for proper mud removal and do not show any tendency for free fluid development.

The rheology of cement slurries designed with this mixture is intermediate between that corresponding to cement slurries designed with either the water-soluble polymer or the latex. This could enable better mud removal, notably in wide annuli when the cement slurry cannot be displaced in turbulent flow.

Most of cement slurries containing the latex/polymer mixture did not develop any free fluid, except in the presence of some retarders, which have strong dispersing properties, at elevated temperatures. Even in those cases the free fluid could easily be completely eliminated by adding small amounts of anti-settling agent. It is remembered that zero free fluid often is difficult to achieve.

A fluid loss control additive according to the present invention typically contains from about 4 wt % to about 8 wt % of water-soluble dry polymer by weight of dry latex suspension Since the latex is typically provided in a suspension in water with a latex content of about 45 wt % and the polymer in a water solution at 10 w %, a new fluid loss control additive with 6 wt % of water-soluble dry polymer by weight of dry latex can be prepared by adding 80 volume of latex suspension to 20 volume of polymer solution.

With this fluid loss control agent comprising 80 volume of latex suspension and 20 volume of polymer solution, excellent fluid loss controls are achieved with concentrations ranging from about 50 to about 200 liters per metric tonne of solid blend (typically cement or cement and silica flour at higher temperatures) or if calculated based on the dry latex content from about 20 kg to about 80 kg of dry latex per metric tonne of blend for temperatures ranging from about 30° C. to about 180° C.; with the higher amounts required for the higher bottomhole temperatures.

This corresponds to an optimal ratio not only with regard to fluid-loss control but also to cement slurry rheology (for proper mud removal when the slurry is displaced in laminar flow) and slurry stability (i.e. no free fluid). The two components can be added separately to cement slurries or can be blended together as a single additive.

BRIEF DESCRIPTION OF THE DRAWING

Other aspects and advantages of the invention will be apparent from the following description and the appended claims, with reference to the accompanying figures in which:

DETAILED DESCRIPTION

Figure 1:
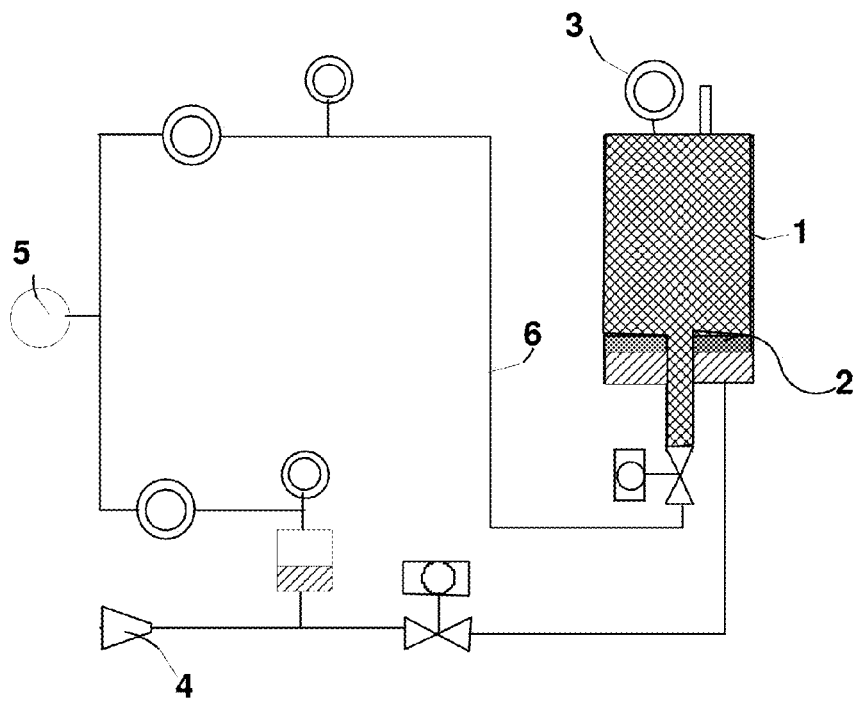
FIG. 1 represents a Cement Hydration Analyzer (CHA), the testing equipment used for evaluating the gas tightness of the cements.

As mentioned above, the invention essentially consists in adding a relatively small amount of water-soluble polymers to latices, to achieve fluid-loss control with reduced quantities of additives.

The latex is preferably a styrene-butadiene copolymer having a styrene to butadiene weight ratio ranging from about 30:70 to about 70:30, and preferably from about 40:60 to about 60:40, suspended in an aqueous solution in the range of from about 40% to about 70% water by weight of the latex. The aqueous solution further includes a latex stabilizer, for instance a surfactant as it is well known in this art. An example of suitable latex suspension can be found in Parcevaux et al.

The water-soluble polymer is a high-molecular weight water-soluble polymer consisting of
(a) 1-99% by weight of structural units of the formula 1:

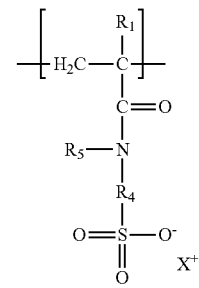

where $R_1$ is hydrogen or methyl, $R_4$ is C1-C22 alkylene, $R_5$ is C1-C22-alkyl or hydrogen, and X is ammonium, lithium, sodium, potassium, an amine or a mixture of these substances; and
(b) 99-1% by weight of structural units of the formula 2:

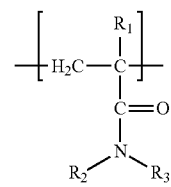

where $R_1$ is hydrogen or methyl, R2 and R3, independently of one another, are hydrogen or C1-C22-alkyl.

R2 and R3 are preferably hydrogen. R4 is preferably a C2-C10-alkylene, most preferably a C3-alkylene and R5 is preferably hydrogen or methyl. Yet according to a preferred embodiment, the copolymer is a copolymer of 2-acrylamido 2-methylpropanesulfonic acid (AMPS) and acrylamide (Am) [in other words $R_1$, $R_2$, $R_3$, and $R_5$ are equal to H and $R_4$ is equal to —C(CH$_3$)$_2$—CH$_2$—].

The weight ratio of units of formula 1 is preferably from 50 to 80% by weight. In yet a further preferred embodiment, the polymer is a copolymer AMPS-AM comprising about 70% by weight of the ammonium salt of AMPS and 30% by weight of acrylamide.

The polymer synthesis may be carried out in aqueous solution, as disclosed for instance in U.S. Pat. No. 4,015,991. In this case, at least about 20% of the acrylamide units are hydrolyzed to acrylic acid. This initial hydrolization can be avoided when, according to a preferred embodiment of the present invention the copolymer is prepared by solution precipitation polymerization in a non-aqueous solvent, or a water-miscible, organic solvent having a low water content, as disclosed for instance in U.S. Pat. No. 6,277,900. Even though a non-hydrolyzed water-soluble polymer is preferred, it should be noted that some hydrolization occurs during the cementation process, the degree of hydrolization being enhanced by the high pH of the interstitial water in the cement slurry.

The performance of latex/polymer mixture was tested at different temperatures ranging from 38° C. (100° F.) to 177° C. (350° F.). Note that it is believed that the fluid loss performance will be maintained at temperatures lower than 38° C., though latices systems are usually not used at very low temperatures since alternative solutions are considered cheaper.

The cement slurries were prepared with different types of cement: a Black Label Dyckerhoff Class G and a Red Label Dyckerhoff Class G cement mixed with fresh water or ASTM seawater to a density of 1.89 g/cm$^3$ (15.8 lbm/gal also noted 15.8 ppg); a Class H cement, mixed with fresh water to a density of 1.96 g/cm$^3$ (16.4 lbm/gal); and a pozzolanic cement mixed with fresh water at 1.62 g/cm$^3$ (13.5 lbm/gal). Tap water was used except for the test with seawater.

Cement slurries designed for elevated temperatures contain 35% by weight of cement (BWOC) of silica flour to prevent the well-known "strength retrogression" effect experienced when the Bottom Hole Static Temperature (BHST) is above 110° C. (230° F.). This corresponds to lower Bottom Hole Circulating Temperatures (BHCT). In the absence of silica flour the compressive strength of the cement matrix is lower and its permeability is higher. These bad performances are due to the formation of alpha-dicalcium silicate hydrate. The addition of 35% BWOC silica flour leads to the formation of other high-temperature cement hydrates (e.g., tobermorite or xonotlite) with better mechanical properties.

An antifoam agent is systematically added to prevent excessive formation of foam during the mixing of cement slurry. A polysiloxane was used as antifoam agent in all tests.

A dispersant and a dispersant aid can be added to obtain properly dispersed slurries. Their presence is not always needed due to the dispersing effect of other additives, notably the retarders when they are used at high concentrations at elevated temperatures. Some slurry designs also require the addition of an anti-settling agent to avoid over-dispersion of slurry due to the retarder, resulting in the appearance of free fluid in some cases. In most cases, an aqueous solution of a salt of polynaphtalene sulfonate was used as dispersant.

Different retarders were used for the different tests, the choice of retarder being determined by the temperature of use. Retarder A is primarily an unrefined lignosulfonate solution, retarder B is an aqueous blend of lignin amine and sodium salt of organic acid, retarder C is based on a mixture of sodium gluconate and sodium silicate, retarder D is a purified lignosulfonate, retarder E is based on a mixture of organic and inorganic salt, retarder F is based on organic acid derivatives, and retarder G is based on a mixture of purified lignosulfonate and organic acids.

To be noted that when a concentration is given in liters per tonne, reference is made to a tonne of blend (cement or cement plus silica flour when present).

Unless otherwise noted, the tested water-soluble polymer was a copolymer AMPS-Am, that dry, corresponds to formula 3:

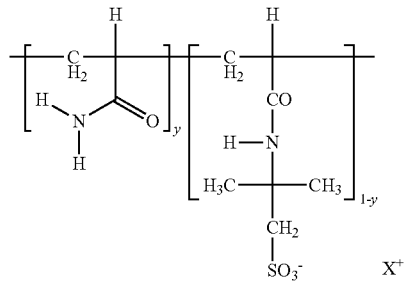

with y being equal to about 0.56 (corresponding to a weight ratio AMPS:Am of about 70:30) and X=NH$_4^+$. Its molecular weight was about 800,000. The polymer is provided in a solution containing 10.7 wt % of dry polymer, 4 w % of sodium chloride and 85.3% of water.

Two grades of SBR latex were used, depending on the temperature of use, that have slightly different styrene to butadiene ratio. The suspension contains about 45 w % dry latex.

When the latex suspension and the water-soluble polymer in solution are mixed together at a volume ratio of 80% latex suspension and 20% water-soluble polymer (which as explained before corresponds actually to a weight ratio of about 3% dry polymer per mass of latex suspension), the viscosity of the mixture is about 3000 mPa·s. It can be decreased significantly by dilution with small amounts of water (e.g., 1200 mPa·s with 15% water)—of course, in this later case, the concentration of added FLAC mixture needs to be adjusted.

API rheology is measured after conditioning the slurry for 20 minutes in an atmospheric consistometer at BHCT or 85° C. (185° F.) when the BHCT exceeds this temperature. The plastic viscosity (in mPa·s) and yield stress (in Pa) of slurry are calculated from the readings obtained at different shear rates corresponding to rotation speeds in the rheometer of 300, 200, 100, 60, 30, 6 and 3 RPM. The Bingham model is used.

The operating free fluid is measured at BHCT or 85° C. (185° F.) when the BHCT exceeds this temperature. The amount of collected free fluid at the top of cement slurry after two hours under static condition is given in mL per 250 mL of cement slurry.

The fluid-loss control is measured at the BHCT with a stirred fluid-loss cell. The time to reach the BHCT is the same as for the thickening time test (table 1). The fluid loss is measured under a differential pressure of 6.895 MPa (1000 psi) through a 325 mesh screen. The API value is calculated by multiplying by two the amount of collected filtrate after 30 minutes filtration.

The thickening time is measured in a pressurized consistometer rotating at 150 RPM. The schedules are reported in table 1. The thickening time value corresponds to the time to reach a slurry consistency of 100 Bearden units, corresponding to the beginning of cement set.

The development of compressive strength is followed using an Ultrasonic Cement Analyzer (UCA). The slurry is introduced right after mixing (i.e., without pre-conditioning period in an atmospheric consistometer) in the UCA cell pressurized at 20.68 MPa (3000 psi). The slurry is heated to BHCT at the same heating rate as for the thickening time tests (see table 1). Times to reach 0.34 MPa (50 psi) and 3.45 MPa (500 psi) compressive strength are reported in tables 4 to 7 as well as the compressive strength value reached after 24 hours curing.

Table 1 depicts the schedules for thickening time tests reported in the different examples below. In the fifth column, time to T/P corresponds to the time to reach the final temperature and pressure.

| Initial Temperature (° C.) | Final Temperature (° C.) | Initial Pressure (psi-MPa) | Final Pressure (psi-MPa) | Time to T/P (min.) | Heating Rate (° C./min.) |
|---|---|---|---|---|---|
| 27 | 38 | 500-3.45 | 2600-17.9 | 14 | 0.79 |
| 27 | 49 | 1000-6.89 | 5200-35.9 | 28 | 0.79 |
| 27 | 66 | 1250-8.61 | 7500-51.71 | 36 | 1.08 |
| 27 | 85 | 1500-10.34 | 10200-70.33 | 44 | 1.32 |
| 27 | 93 | 1750-12.07 | 13400-92.39 | 52 | 1.27 |
| 27 | 104 | 1750-12.07 | 13400-92.39 | 52 | 1.48 |
| 27 | 110 | 2000-13.79 | 16100-111.0 | 60 | 1.38 |
| 27 | 121 | 2000-13.79 | 16100-111.0 | 60 | 1.57 |
| 27 | 132 | 2000-13.79 | 16100-111.0 | 60 | 1.75 |
| 27 | 149 | 2000-13.79 | 16100-111.0 | 34 | 3.59 |
| 27 | 166 | 2000-13.79 | 22000-151.7 | 44 | 3.16 |
| 27 | 177 | 2000-13.79 | 22000-151.7 | 44 | 3.41 |

EXAMPLE 1

These tests were carried out with retarder C. All slurries were prepared with Black Label Dyckerhoff Class G cement, mixed at 1.89 g/cm$^3$ (15.8 ppg) density with freshwater.

Table 2 depicts the rheology and fluid loss performance, of 3 cement slurries. The fluid-loss control is considered as good when the API fluid-loss value is below 100 mL/30 min, and considered as excellent when the value is less than 50 mL/30 min. Slurries #1 and #2, according to the prior art contain only one fluid loss control agent, either a water-soluble polymer (test #1) or a styrene-butadiene latex suspension (test #2). Slurry #3, according to the present invention, on the other hand contains as fluid loss control agent (FLAC), a mixture of 80% (by volume) of the same styrene-butadiene latex as in test #2 and 20% (by volume) of the same water-soluble polymer as in test #1.

Results essentially similar to the results obtained in test #2 were obtained in test #3 although the latex concentration is about one third the concentration in test #3 (in test #3, the concentration of water-soluble polymer is 13.16 liters per metric tonne of cement blend and 52.64 liters per metric tonne of cement blend). Moreover, this effect is obtained with a small amount of water-soluble polymer that, in itself, would not have provided any fluid loss control.

TABLE 2

| | Test | | |
|---|---|---|---|
| | #1 | #2 | #3 |
| BHCT (° C.) | 121 | 121 | 121 |
| Silica Flour (% BWOC) | 35 | 35 | 35 |
| Anti-settling Agent (% BWOC) | 0.3 | — | 0.3 |
| Antifoam Agent (L/tonne*) | 1.97 | 1.97 | 1.97 |
| Dispersant (L/tonne*) | — | 3.29 | — |
| Retarder C (L/tonne*) | 9.86 | 9.21 | 9.86 |
| New FLAC (L/tonne) | — | — | 65.8 |
| Water Soluble Polymer (L/tonne*) | 32.9 | — | — |
| Styrene-Butadiene Latex (L/tonne*) | — | 164.4 | — |
| Mixing Rheology: | | | |
| Plastic Viscosity (mPa · s) | 176 | 46 | 94 |
| Yield Stress (Pa) | 15.8 | 4.2 | 10.6 |
| API Rheology at 85° C.: | | | |
| Plastic Viscosity (mPa · s) | 95 | 26 | 63 |
| Yield Stress (Pa) | 3.8 | 1.4 | 4.2 |
| Free fluid at 85° C. | 0 | 3 | 0 |
| API Fluid Loss at 121° C. | 72 | 34 | 44 |
| Thickening Time at 121° C. (hr:min) | 7:05 | 5:54 | 5:46 |

*tonne of blend (cement + silica flour)

Data reported in table 2 illustrate the fact that the plastic viscosity of the cement slurry containing the new FLAC is higher than that of the slurry designed with the latex and lower than that of the slurry designed with the water-soluble polymer. An "intermediate" slurry viscosity can be valuable in terms of proper mud removal.

The rheologies measured right after slurry mixing are also reported in table 2. It is generally recognized that severe mixing difficulties are encountered if the plastic viscosity at the mixing stage exceeds about 300 mPa·s. The plastic viscosity can increase sharply if the slurry porosity is decreased in order to raise the slurry density (i.e., water-reduced slurries) or to apply the multi-modal concept known for instance from European Patent 621,647. Consequently the new FLAC is particularly suitable for those slurries.

Despite the lower slurry viscosity it is noted that the fluid-loss control obtained with the new FLAC is significantly better than that provided by the water-soluble polymer. The latex, used alone, gives an excellent fluid-loss control but high concentrations are generally needed.

EXAMPLE 2

Data gathered in table 3 show the effect of the volume ratio of water-soluble polymer to latex suspension. To be noted that the measure of free fluid cannot be made at a temperature greater than 85° C. (185° F.), so whenever the BHCT is greater than 85° C., the test was actually carried out at this temperature and not the BHCT. All slurries were prepared with Black Label Dyckerhoff Class G cement, mixed at 1.89 g/cm$^3$ (15.8 ppg) density with freshwater.

TABLE 3

| | Test | | | |
|---|---|---|---|---|
| | #4 | #5 | #6 | #7 |
| BHCT (° C.) | 66 | 66 | 121 | 121 |
| Silica Flour (% BWOC) | — | — | 35 | 35 |
| Antifoam Agent (L/tonne*) | 2.66 | 2.66 | 1.97 | 1.97 |
| Dispersant (L/tonne*) | 4.66 | 4.66 | 2.63 | 2.63 |
| Retarder A (L/tonne*) | 0.89 | 0.89 | — | — |
| Retarder B (L/tonne*) | — | — | 6.58 | 6.58 |
| Water Soluble Polymer (L/tonne*) | 17.75 | 13.32 | 15.78 | 11.84 |

TABLE 3-continued

|  | Test | | | |
| --- | --- | --- | --- | --- |
|  | #4 | #5 | #6 | #7 |
| Styrene-Butadiene Latex (L/tonne*) | 71.02 | 75.45 | 63.13 | 67.04 |
| Latex suspension/Polymer solution volume ratio | 80/20 | 85/15 | 80/20 | 85/15 |
| Free fluid at 66° C. (or 85° C.) | 0 | Traces | 0 | Traces |
| API Fluid Loss at BHCT | 42 | 50 | 54 | 65 |

*tonne of blend (cement in tests #4 and #5 and cement + silica flour in tests #6 and #7)

An increase of the latex/polymer ratio leads to higher fluid loss, and appearance of free fluid, none of this characteristics being desirable.

EXAMPLE 3

Data gathered in table 4 show the effect of the type of chosen retarder in the formulation. The slurries were prepared with fresh water, with class G Black Label Dyckerhoff cement at 1.89 g/cm³ (15.8 ppg) density. Except in tests #22 and #23, the fluid loss control agent (noted FLAC) is a mixture of 80% (by volume) of the same styrene-butadiene latex as in test #2 and 20% (by volume) of the same water-soluble polymer as in test #1.

Temperatures range from 49° C. to 177° C., determining the choice of retarder. Also when found suitable, an antisettling agent was added. To be noted that tests #22 and #23, performed at temperatures higher than 150° C. were carried out with a styrene-butadiene latex grade adapted to higher temperatures.

TABLE 4

|  | Test | | | | | |
| --- | --- | --- | --- | --- | --- | --- |
|  | #8 | #9 | #10 | #11 | #12 | #13 |
| BHCT (° C.) | 49 | 66 | 66 | 85 | 85 | 85 |
| Antifoam Agent (L/tonne*) | 2.66 | 2.66 | 2.66 | 2.66 | 2.66 | 2.66 |
| Dispersant (L/tonne*) | 3.55 | 4.44 | 4.44 | 4.44 | 4.44 | 4.44 |
| Dispersant Aid (L/tonne*) | — | — | — | 3.55 | — | — |
| Retarder A (L/tonne*) | 0.89 | 0.89 | — | 2.66 | — | — |
| Retarder C (L/tonne*) | — | — | 1.78 | — | — | — |
| Retarder D (L/tonne*) | — | — | — | — | 1.78 | — |
| Retarder E (L/tonne*) | — | — | — | — | — | 2.66 |
| FLAC (L/tonne*) | 70.9 | 88.8 | 88.8 | 88.8 | 88.8 | 88.8 |
| API Rheology at BHCT: | | | | | | |
| Plastic Viscosity (mPa · s) | 54 | 59 | 57 | 59 | 62 | 56 |
| Yield Stress (Pa) | 3.1 | 4.5 | 3.5 | 5.6 | 9.6 | 6.4 |
| Free fluid at BHCT | 0 | 0 | 0 | 0 | 0 | 0 |
| API Fluid Loss at BHCT | 60 | 42 | 51 | 54 | 50 | 61 |
| Thickening Time at BHCT | 3:29 | 4:39 | 6:42 | 6:21 | 5:19 | 6:09 |
| Compressive Strength at BHCT: | | | | | | |
| Time to reach 50 psi (hr:min) | 7:20 | 14:24 | 15:16 | 17:36 | 8:20 | 11:28 |
| Time to reach 500 psi (hr:min) | 8:52 | 15:48 | 16:28 | 19:32 | 10:04 | 13:00 |
| Compressive at 24 hours (psi) | 2455 | 1860 | 1915 | 1730 | 2120 | 2285 |

*tonne of cement

|  | Test | | | | | |
| --- | --- | --- | --- | --- | --- | --- |
|  | #14 | #15 | #16 | #17 | #18 | #19 |
| BHCT (° C.) | 93 | 93 | 104 | 121 | 121 | 121 |
| Silica flour (% BWOC) | 35 | 35 | 35 | 35 | 35 | 35 |
| Antisettling agent (% BWOC) | — | — | — | 0.3 | — | — |
| Antifoam Agent (L/tonne*) | 1.97 | 1.97 | 1.97 | 1.97 | 1.97 | 1.97 |
| Dispersant (L/tonne*) | 3.29 | 1.32 | 3.29 | — | 4.60 | 2.63 |
| Dispersant Aid (L/tonne*) | — | 1.97 | 3.29 | — | — | — |
| Retarder B (L/tonne*) | — | — | — | — | — | 6.58 |
| Retarder C (L/tonne*) | 1.97 | — | — | 9.86 | — | — |
| Retarder D (L/tonne*) | — | 2.63 | — | — | — | — |
| Retarder F (L/tonne*) | — | — | 2.63 | — | 7.23 | — |
| FLAC (L/tonne*) | 65.8 | 78.9 | 65.8 | 65.8 | 78.9 | 78.9 |
| API Rheology at 85° C.: | | | | | | |
| Plastic Viscosity (mPa · s) | 63 | 84 | 49 | 63 | 57 | 64 |
| Yield Stress (Pa) | 4.1 | 5.4 | 5.6 | 4.2 | 3.8 | 3.0 |
| Free fluid at 85° C. | 0 | 0 | 0 | 0 | 0 | 0 |
| API Fluid Loss at BHCT | 65 | 58 | 50 | 44 | 49 | 54 |
| Thickening Time at BHCT | 5:30 | 3:01 | 5:47 | 5:46 | 9:59 | 5:46 |
| Compressive Strength at BHCT: | | | | | | |
| Time to reach 50 psi (hr:min) | 9:00 | 8:36 | 6:56 | 5:10 | 6:48 | 6:04 |
| Time to reach 500 psi (hr:min) | 10:32 | 9:52 | 8:00 | 6:12 | 8:36 | 7:28 |
| Compressive at 24 hours (psi) | 2530 | 2400 | 2535 | 2665 | 2425 | 2245 |

*tonne of blend (cement + silica flour)

TABLE 4-continued

| | Test | | | |
|---|---|---|---|---|
| | #20 | # 21 | # 22 | # 23 |
| BHCT (° C.) | 132 | 149 | 166 | 177 |
| Silica flour (% BWOC) | 35 | 35 | 35 | 35 |
| Antisettling agent (% BWOC) | 0.2 | 0.2 | 0.2 | 0.3 |
| Antifoam Agent (L/tonne*) | 1.97 | 1.97 | 1.97 | 1.97 |
| Retarder B (L/tonne*) | 9.86 | 16.44 | 16.44 | 17.75 |
| Retarder G (L/tonne*) | — | 9.86 | 16.44 | 17.75 |
| FLAC (L/tonne*) | 78.9 | 92.1 | 131.5 | 144.7 |
| API Rheology at 85° C.: | | | | |
| Plastic Viscosity (mPa · s) | 63 | 67 | 73 | 83 |
| Yield Stress (Pa) | 2.3 | 5.3 | 4.5 | 10.9 |
| Free fluid at 85° C. | 0 | 0 | 0 | 0 |
| API Fluid Loss at BHCT | 56 | 72 | 60 | 46 |
| Thickening Time at BHCT | 6:21 | 5:53 | 10:34 | 6:02 |
| Compressive Strength at BHCT: | | | | |
| Time to reach 50 psi (hr:min) | 5:16 | 13:40 | 21:20 | 8:04 |
| Time to reach 500 psi (hr:min) | 6:52 | 15:52 | 25:40 | 9:52 |
| Compressive at 24 hours (psi) | 1900 | 2170 | 310 | 1855 |

*tonne of blend (cement + silica flour)

The new FLAC can be used with different retarders and its performance does not appear to depend significantly on the chemistry of retarder. The thickening time can easily be adjusted with the retarder and the cement develops rapidly its compressive strength.

It is noted that excellent fluid-loss control is achieved at temperature of 66° C. (150° F.) and 85° C. (185° F.) when using 88.8 liters of the new fluid-loss control additive (FLAC) per tonne of cement. This concentration corresponds to 17.76 liters (20%) of water-soluble polymer and 71.04 liters (80%) of latex suspension. These concentrations would not allow obtaining good fluid-loss control if these two additives were not used together. Actually such level of fluid-loss control is somehow attributed to a synergy between the latex and the water-soluble polymer.

Cement slurries are properly dispersed (low yield stress) and plastic viscosity values are not very high (around 60 mPa·s) enabling an easy placement of slurry in long and narrow annuli. They do not develop any free fluid, property that is not always easy to achieve, especially when the free fluid is measured at BHCT (or 85° C.) and not at room temperature.

The thickening time can easily be adjusted with the retarder and the cement develops rapidly its compressive strength.

Data gathered in tables 4 also show that similar results are obtained at higher temperatures. These slurries contain 35% BWOC silica flour to prevent the "strength retrogression" effect that occurs when the curing temperature is above 110° C. (230° F.). The addition of silica flour results in slightly lower slurry porosity (i.e., volume of water-to-volume of slurry) if the slurry density is maintained constant at 1.89 g/cm$^3$ (15.8 ppg). So the concentration of FLAC was reduced accordingly. Nevertheless it is noted that excellent fluid-loss control could still be achieved at elevated temperatures. This feature is rather unusual because it is known that the concentration of fluid loss control agent, which are based on water-soluble polymers, has to be increased significantly when raising temperature. At temperatures higher than 150° C., higher concentrations are required but it remains that compared to standard fluid loss control agents, the fluid-loss control performance of the new FLAC is far less temperature sensitive.

At very high temperatures the addition of an anti-settling agent is generally required due to the dispersing effect of some retarders that have to be used at high concentrations to get long enough thickening times. Even in the presence of an anti-settling agent it is not always easy to obtain zero free fluid. Thus the new FLAC is particularly beneficial with regard to this important property.

EXAMPLE 4

In this series of tests, the class G cement was replaced by a coarser LeHigh Class H cement, mixed with fresh water at 1.97 g/cm$^3$ (16.4 ppg) density. The formulations, rheological properties and basic setting properties are gathered table 5.

Again, a wide range of temperatures was covered. As for example 3, with the highest temperatures (#28 and #29), a special grade of latex was used.

TABLE 5

| | Test | | | | | |
|---|---|---|---|---|---|---|
| | # 24 | # 25 | # 26 | # 27 | # 28 | # 29 |
| BHCT (° C.) | 38 | 93 | 121 | 149 | 166 | 177 |
| Silica Flour (% BWOC) | — | 35 | 35 | 35 | 35 | 35 |
| Antifoam Agent (L/tonne*) | 2.66 | 1.97 | 1.97 | 1.97 | 1.97 | 1.97 |
| Retarder E (L/tonne*) | — | 6.58 | — | — | — | — |
| Retarder B (L/tonne*) | — | — | 7.89 | 15.12 | 17.10 | 18.41 |
| Retarder G (L/tonne*) | — | — | — | 15.12 | 17.10 | 18.41 |
| FLAC (L/tonne*) | 62.1 | 75.6 | 82.2 | 98.6 | 118.4 | 131.5 |

TABLE 5-continued

|  | Test | | | | | |
| --- | --- | --- | --- | --- | --- | --- |
|  | # 24 | # 25 | # 26 | # 27 | # 28 | # 29 |
| API Rheology at BHCT or 85° C.: | | | | | | |
| Plastic Viscosity (mPa · s) | 88 | 133 | 154 | 123 | 113 | 128 |
| Yield Stress (Pa) | 7.9 | 9.0 | 5.5 | 8.3 | 8.1 | 7.6 |
| Free Fluid at BHCT or 85° C. | 0 | 0 | 0 | 0 | 0 | 0 |
| API Fluid Loss at BHCT | 50 | 53 | 57 | 50 | 59 | 41 |
| Thickening Time at BHCT | 3:19 | 4:35 | 5:40 | 5:27 | 10:00 | 6:22 |
| Compressive Strength at BHCT: | | | | | | |
| Time to reach 50 psi (hr:min) | 6:20 | 8:48 | 5:24 | 15:32 | 18:32 | 8:37 |
| Time to reach 500 psi (hr:min) | 8:48 | 10:40 | 6:36 | 18:20 | 20:26 | 10:15 |
| Compressive at 24 hours (psi) | 2750 | 2075 | 1715 | 1705 | 2020 | 1840 |

*tonne of blend (cement in test #24; and cement + silica flour in tests #25 to #29)

It is worth noting that the FLAC according to the present invention does not have a retarding effect at low temperature (38° C.), so that the addition of an accelerator was not required. This is indeed advantageous since any addition of an accelerator may be detrimental to some of the slurry properties (e.g. fluid loss control and rheology) and make designing the slurry more complex. Plastic viscosities in this series of tests were higher due to lower slurry porosities.

EXAMPLE 5

This series of tests was carried out to check that it was possible to use the fluid loss control agent according to the present invention with seawater as mixing fluid, as it is sometimes the case in offshore applications.

All slurries of table 6 were prepared with Red Label Dyckerhoff Class G cement, mixed with ASTM seawater at 1.89 g/cm³ (15.8 ppg) density. The slurry porosity was equal to 60.7% for tests #30 and #31, where no silica flour was added and to 57.2% for tests #32 and #33 where 35% BWOC silica flour was added.

TABLE 6

|  | Test | | | |
| --- | --- | --- | --- | --- |
|  | # 30 | # 31 | # 32 | # 33 |
| BHCT (° C.) | 49 | 85 | 110 | 132 |
| Silica Flour (% BWOC) | — | — | 35 | 35 |
| Antifoam Agent (L/tonne*) | 2.66 | 2.66 | 1.97 | 1.97 |
| Dispersant (L/tonne*) | 15.09 | 15.09 | 9.86 | — |
| Dispersant Aid (L/tonne*) | — | 2.66 | — | — |
| Retarder A (L/tonne*) | 1.33 | — | — | — |
| Retarder D (L/tonne*) | — | 3.55 | — | — |
| Retarder B (L/tonne*) | — | — | 6.58 | 13.15 |
| Retarder G (L/tonne*) | — | — | — | 13.15 |
| FLAC (L/tonne*) | 97.6 | 111.0 | 92.1 | 98.6 |
| API Rheology at BHCT or 85° C.: | | | | |
| Plastic Viscosity (mPa · s) | 76 | 51 | 106 | 48 |
| Yield Stress (Pa) | 3.6 | 5.5 | 7.4 | 2.4 |
| Free Fluid at BHCT or 85° C. | 0 | 0 | 0 | 0 |
| API Fluid Loss at BHCT | 61 | 58 | 51 | 61 |
| Thickening Time at BHCT | 6:29 | 6:14 | 6:47 | 8:57 |
| Compressive Strength at BHCT: | | | | |
| Time to reach 50 psi (hr:min) | 13:24 | 18:48 | 10:20 | 35:56 |
| Time to reach 500 psi (hr:min) | 15:12 | 21:32 | 11:36 | 39:04 |
| Compressive at 24 hours (psi) | 2605 | 1130 | 2160 | — |

*tonne of blend (cement in tests #30 and #31; and cement + silica flour in tests #32 and #33)

Table 6 shows that the new FLAC is compatible with seawater, though higher FLAC concentrations are required to achieve a good fluid loss, as it is often observed with other fluid loss control agents when seawater is used.

EXAMPLE 6

The new fluid loss control agent is also compatible with lightweight cement such as the TXI lightweight cement (a fine pozzolanic cement with a specific gravity of 2.84, compared to about 3.23 for Class G and Class H cements). The slurries of table 7 were mixed with fresh water at 1.62 g/cm³ (13.5 ppg) density, with a slurry porosity of 66.8%. Since the TXI lightweight cement has a CaO-to-SiO2 ratio much lower than that of Class G and Class H cements, no silica flour was added at elevated temperatures.

TABLE 7

|  | Test | | |
| --- | --- | --- | --- |
|  | # 34 | # 35 | # 36 |
| BHCT (° C.) | 49 | 85 | 110 |
| Antifoam Agent (L/tonne) | 4.44 | 4.44 | 4.44 |
| Dispersant (L/tonne) | 8.88 | 13.32 | 8.88 |
| Dispersant Aid (L/tonne) | — | — | 4.44 |
| Retarder A (L/tonne) | 4.44 | — | — |
| Retarder E (L/tonne) | — | 7.10 | — |
| Retarder B (L/tonne) | — | — | 11.54 |
| FLAC (L/tonne) | 124.3 | 142.0 | 150.9 |
| API Rheology at BHCT or 85° C.: | | | |
| Plastic Viscosity (mPa · s) | 57 | 46 | 49 |
| Yield Stress (Pa) | 5.2 | 3.8 | 5.5 |
| Free Fluid at BHCT or 85° C. | 0 | 0 | 0 |
| API Fluid Loss at BHCT | 54 | 58 | 54 |
| Thickening Time at BHCT | 4:47 | 4:37 | 4:49 |
| Compressive Strength at BHCT: | | | |
| Time to reach 50 psi (hr:min) | 9:08 | 12:44 | 7:44 |
| Time to reach 500 psi (hr:min) | 13:00 | 14:52 | 8:24 |
| Compressive at 24 hours (psi) | 1275 | 2115 | 1795 |

These tests show that the new fluid loss control agent can indeed be used with this type of system. However, higher concentrations are required because of the higher porosity. It should be noted that in general, latex systems do not work properly and are not considered cost effective when the slurry porosity is higher than 63%

EXAMPLE 7

A gas migration test was performed using the Cement Hydration Analyzer (CHA) schematized in FIG. 1. This equipment essentially consists of a cylindrical cell 1, filled with the cement slurry and pressurized with a piston 2 located at the bottom. The pore pressure of cement slurry is measured with the pressure sensor 3. Water can be supplied through a water supply 4 to maintain a constant pressure during the test. The equipment further comprises a gas source 5 ($N_2$ for testing purpose) so that gas can be injected into the slurry through pipe 6.

Initially, the slurry is poured into the cell and a pressure of 2.49 MPa is applied through the piston. While keeping this pressure constant, the pore pressure is monitored. With the beginning of the cement setting, the pore pressure, initially identical to the piston pressure, starts to decrease. When it reaches 1.75 MPa, nitrogen is injected.

If the cement slurry is gas tight, the decrease of the pore pressure goes on. However, if the cement is permeable, the pore pressure raises again after a gap period that reflects the time required for the gas to migrate through the whole cement column.

A slurry was prepared with fresh water, Black Label Dyckerhoff Class G cement with 35% BWOC silica flour. It further contains 1.97 L/tonne of blend (silica flour+cement) of an antifoam agent, 1.32 L/tonne of blend of a dispersing agent, 0.97 L/tonne of blend of retarder D and 78.9 L/tonne of blend of the new fluid loss control agent according to the present invention. The slurry density is 1.89 g/cm3 (15.8 ppg).

Figure 2:
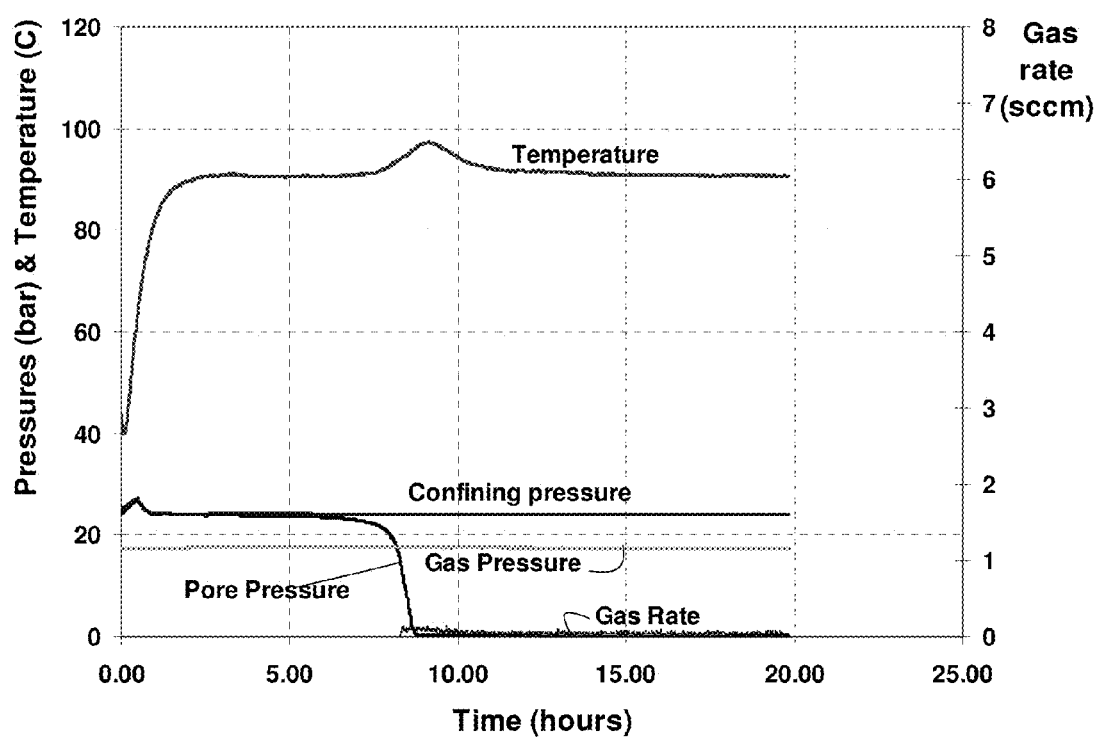
FIG. 2 is the flow chart of the tests results with the CHA equipment.

The test is carried out at 93° C. As shown in FIG. 2, once the injection of the gas starts, the pore pressure continues to decrease until it reaches zero after complete setting of the cement, so that the cement is effectively considered gas tight.

The invention claimed is:

1. A method of cementing a well, comprising:
   (i) preparing a fluid-loss control agent consisting of a single mixture of a styrene-butadiene latex and an unhydrolyzed water-soluble polymer having a molecular weight between 200,000 and 4,000,000;
   (ii) adding the fluid loss control agent to a cement slurry comprising cement and water; and
   (iii) placing the slurry in the well.

2. The method of claim 1, wherein the water-soluble polymer has a molecular weight ranging from about 600,000 to about 1,200,000.

3. The method of claim 1, where the styrene-butadiene latex is a suspension containing about 45 wt % dry latex.

4. The method of claim 3, wherein the styrene-butadiene latex contains 70-30 wt % butadiene and 30-70 wt % styrene.

5. The method of claim 3, wherein the styrene-butadiene latex contains 40-60 wt % butadiene and 60-40 wt % styrene.

6. The method of claim 1, wherein the water-soluble polymer consists of:
   (a) 1-99% by weight of structural units of the formula:

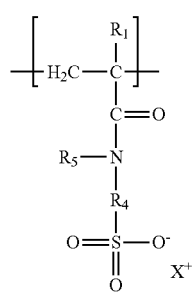

where $R_1$ is hydrogen or methyl, $R_4$ is $C_1$-$C_{22}$ alkylene, $R_5$ is $C_1$-$C_{22}$ alkyl or hydrogen, and X is ammonium, lithium, sodium, potassium, an amine or a combination thereof;
   (b) 99-1% by weight of structural units of the formula:

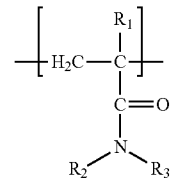

where $R_1$ is hydrogen or methyl, $R_2$ and $R_3$, independently of one another, are hydrogen or $C_1$-$C_{22}$ alkyl.

7. The method of claim 6, wherein R2 and R3 are hydrogen.

8. The method of claim 6, wherein $R_4$ is a $C_2$-$C_{10}$ alkylene.

9. The method of claim 1, wherein the water-soluble polymer is prepared by solution precipitation polymerization in a non-aqueous solvent, or a water-miscible solvent having a low water content, which is a precipitant for the copolymer, so that the dry copolymer is not hydrolyzed.

10. The method of claim 1, wherein the water-soluble polymer is present at a concentration between about 4 wt % and 8 wt % of dry polymer by weight of dry latex.

11. The method of claim 1, wherein the concentration of fluid loss agent added to achieve a given American Petroleum Institute (API) fluid loss is about half that required to achieve said fluid loss with the sole addition of latex.

12. The method of claim 1, wherein the well is subject to gas migration.

13. A method for controlling gas migration in a subterranean well that has at least one gas producing zone, comprising:
   (i) preparing a fluid-loss control agent consisting of a single mixture of a styrene-butadiene latex and an unhydrolyzed water-soluble polymer having a molecular weight between 400,000 and 2,000,000;
   (ii) adding the fluid-loss control agent to a cement slurry comprising cement and water; and
   (iii) placing the cement slurry into the well.

14. The method of claim 13, wherein the water-soluble polymer consists of:
   (a) 1-99% by weight of structural units of the formula:

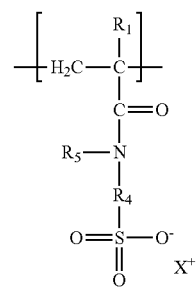

where $R_1$ is hydrogen or methyl, $R_4$ is $C_1$-$C_{22}$ alkylene, $R_5$ is $C_1$-$C_{22}$ alkyl or hydrogen, and X is ammonium, lithium, sodium, potassium, an amine or a combination thereof;

(b) 99-1% by weight of structural units of the formula:

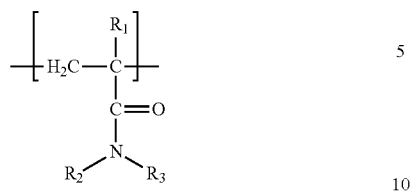

where $R_1$ is hydrogen or methyl, $R_2$ and $R_3$, independently of one another, are hydrogen or $C_1$-$C_{22}$ alkyl.

15. The method of claim 13, wherein the styrene-butadiene latex is a suspension containing about 45 wt % dry latex.

16. The method of claim 13, wherein the water-soluble polymer is present at a concentration between about 4 wt % and 8wt % of dry polymer by weight of dry latex.

17. The method of claim 13, wherein the concentration of fluid loss agent added to achieve a given American Petroleum Institute (API) fluid loss is about half that required to achieve said fluid loss with the sole addition of latex.

* * * * *